United States Patent [19]

Bowen

[11] 3,930,693
[45] Jan. 6, 1976

[54] FULL COMPLEMENT BEARING HAVING PRELOADED HOLLOW ROLLERS

[75] Inventor: Willard L. Bowen, Harwinton, Conn.

[73] Assignee: The Torrington Company, Torrington, Conn.

[22] Filed: Feb. 2, 1973

[21] Appl. No.: 329,024

Related U.S. Application Data

[30] Continuation-in-part of Ser. No. 39,767, May 22, 1970 and continuation-in-part of Ser. No. 287,010, Sept. 7, 1972, Pat. No. 3,765,071.

[52] U.S. Cl.......... 308/207 R; 308/184 R; 308/215; 29/148.4 A
[51] Int. Cl.²..................... B63P 11/00; B21H 1/14
[58] Field of Search .......... 308/184, 215, 207, 184, 308/47, 215, 216; 29/148.4 A, 148.4 D

[56] References Cited
UNITED STATES PATENTS

| 715,579 | 9/1954 | UK | |
|---|---|---|---|
| 1,327,026 | 1/1920 | Dobbs et al. | 308/184 R |
| 1,652,766 | 12/1927 | Crouse | 308/184 |
| 2,859,076 | 11/1958 | Lorig | 308/202 |
| 3,410,618 | 11/1968 | Harris et al. | 308/207 |
| 3,713,712 | 1/1973 | Derner et al. | 308/215 |
| 3,765,071 | 10/1973 | Bowen | 29/148.4 A |

FOREIGN PATENTS OR APPLICATIONS

| 485,813 | 5/1938 | United Kingdom | 308/215 |
|---|---|---|---|
| 715,579 | 9/1954 | United Kingdom | 308/215 |
| 1,024,955 | 1/1953 | France | 308/215 |

*Primary Examiner*—M. Henson Wood, Jr.
*Assistant Examiner*—Richard A. Bertsch
*Attorney, Agent, or Firm*—Diller, Brown, Ramik & Wight

[57] ABSTRACT

This disclosure relates to a full complement bearing and the method of forming the same wherein the rollers of the bearing are hollow and are installed between the bearing races in a preloaded condition. Further, the rollers have the end portions thereof relieved so that only the central portion of each roller is cylindrical. Such a roller bearing produces highly desirable and unexpected results. First, the runout of the bearing is at a minimum. In fact, utilizing lower grade components, a full complement hollow roller bearing formed in accordance with this disclosure will have the superior minimum runout of a much higher grade bearing utilizing solid rollers. In addition, the life expectancy of the full complement bearing is much greater than that of like full complement bearings having solid rollers.

11 Claims, 5 Drawing Figures

FULL COMPLEMENT BEARING HAVING PRELOADED HOLLOW ROLLERS

This application is a continuation-in-part of my prior filed copending application Ser. No. 39,767, filed May 22, 1970, entitled Roller Bearing for Supporting Grinding Wheel with Great Decrease in Runout, and my copending application Ser. No. 287,010, filed Sept. 7, 1972, now U.S. Pat. No. 3,765,071, and entitled Method of Forming a Roller Bearing of Superior Runout Characteristics, which application is also a continuation-in-part of my earlier filed copending application Ser. No. 39,767.

This invention relates in general to new and useful improvements in anti-friction bearings, and more particularly to improvements in full complement bearings with special emphasis being placed upon anti-friction bearings of the type wherein the rolling elements are hollow with the utilization of hollow rolling elements providing for an unexpected decrease in runout and relatively long operating life.

BACKGROUND OF THE INVENTION

It is well known to provide full complement anti-friction bearings. While such bearings have many advantages, they also have certain wear disadvantages. It is well known that the average load on a bearing is a radial load so that a bearing is considered to have a loaded zone between the races thereof in the area of load application and an unloaded zone diametrically remote from the loaded zone. The loaded and unloaded conditions of the bearing result in differential movement of the rolling elements relative to the races and produces undesirable wear characteristics.

First of all, in an anti-friction bearing utilizing solid rolling elements, the rolling elements must have a diameter slightly less than the radial spacing between the two raceways. As a result, when the rolling elements pass into the unloaded zone, they have little or no tendency to travel circumferentially relative to the relatively fixed one of the two raceways in that they are not in driven contact with the relatively rotating raceway. Accordingly, the rolling elements are pushed through the unloaded zone by the rolling elements disposed within the loaded zone. The net result is that the rolling elements are free to slide and do slide between the raceways in the unloaded zone and so cause wearing of flats thereon.

The fact that the rolling elements are not driven in the unloaded zone results in a speed up of the circumferential movement of the rolling elements as they approach the loading zone and pass therethrough with the maximum circumferential movement of the rolling elements. As the rolling elements begin to move out of the loading zone, they begin to progressively slow down with the result that the rolling elements are jammed together in the loaded zone and come into pressure contact with one another with the contacting surfaces rotating in opposite directions and wearing against one another.

It is also known that with full complement roller bearings, there is a tendency for the rollers to become skewed, that is non-parallel to the axis of the bearing, with the result that there is a tendency for the rollers to become wedged.

It is also to be understood that the sliding and rubbing of the rolling elements is detrimental to bearing life in that the increase in bearing friction results in a rise in temperature.

In the past, it has been recognized that with respect to anti-friction bearings wherein the rolling elements are mounted within a cage so that all of the rolling elements travel circumferentially in unison, the cage and the rolling elements are driven by those few rolling elements disposed in the loaded zone. While the provision of the cage has prevented rubbing contact between adjacent rolling elements, a new problem occurs. The driving force required to move the cage and roller complement circumferentially resists the rolling of the rolling elements through the loaded zone with the result that undue slip between the rolling elements and the driving raceway occurs. This is particularly true during the start up of the rotation of the bearing particularly when high acceleration exists.

This deficiency in caged roller bearings has been recognized in the past, and progressive efforts have been made to overcome the slippage between the rolling elements and the driving raceway. These include first forming a limited number of the rolling elements as cage driving members. For example, three of the rolling elements would be of a hollow construction with very little load sustaining ability, but of a diameter to be in constant pressure contact with the raceways at all times. This arrangement has a deficiency in that the load capability of the bearing was materially reduced. In a further development which is found in U.S. Pat. No. 3,410,618 to Tedric A. Harris, et al., granted Nov. 12, 1968, all of the rollers were made hollow and preloaded. Such an arrangement greatly improved the resistance to skidding.

However, none of these prior developments in any way suggested how one could overcome the deficiencies of full complement bearings.

SUMMARY OF THE INVENTION

A principal feature of this invention is the provision of a full complement bearing wherein all of the rolling elements thereof are hollow and are assembled with associated raceways in a preloaded condition. This anti-friction bearing assembly has marked advantages including increased load carrying capacity and ability to operate at very high speeds with greater efficiency than bearings having cages or separators.

First, the rolling elements are in pressure contact with the associated raceways for 360° around the bearing and are therefore made to roll at all times and no sliding can occur. Next, the hollow rolling elements, being flexible in nature, space themselves apart when rolling through the load zone of the bearing. In doing so, the rollers in the load zone push themselves apart as they become flexed to a greater oval shape. This spacing occurs during initial operation of the bearing under load. The major axis of the ovality is in the circumferential direction of the bearing and is generally at the pitch chord of the rolling elements. Thus, the rolling elements space themselves apart. As they roll into the unloaded area of the bearing the deflection in ovality decreases and the space between adjacent rolling elements increases providing space for lubricant circulation.

The flexibility of the hollow rolling elements has another advantage for maintaining an oil film between the rolling elements and the raceway. There are two conditions which tend to increase the oil film at the rolling contact point and this greatly increases the fatigue life of the bearing. First, the rolling element now flexed into an oval shape has increased its contact area with both of the raceway surfaces. Although small, the effect of this greater contact is to reduce the critical contact stress and increase surface fatigue life. Secondly, the flexibility of the hollow rolling element helps retain an oil film on the rolling surfaces. Instead of scouring the oil away, the rolling element flexes slightly and rolls over the lubricant film to avoid metal-to-metal contact. Although this action will occur in bearings having solid rolling elements, particularly at higher speeds, the hollow roller elements promote this condition even at low speeds of rotation. The net result is an increase in bearing life to 4 to 5 times over that obtained with solid rolling elements.

Next, it has been found that by utilizing hollow rolling elements, particularly in the case of rollers, a marked decrease in runout can be obtained. It has been found that the runout characteristics of a bearing formed in accordance with this invention utilizing components of a predetermined grade will have the runout characteristics of a bearing of a much higher quality.

Finally, it has been found that hollow rollers may be advantageously utilized in a full complement bearing in a manner so as to eliminate the wedging of the rollers when they become skewed. It is to be understood that when the hollow rollers are preloaded between the raceways, the rollers will have a certain degree of flexibility and as they tend to become skewed, when wedging would normally occur, the rollers can flex so as to eliminate wedging. This, however, has not been found to be a solution to the complete problem. As a result, the end portions of the cylindrical rollers have been relieved. Thus, when the rollers are preloaded between the raceways, the preloading is primarily in the central portion of the rollers with the end portions either being lightly loaded or not loaded at all. Thus, when the rollers skew, the relief provides clearance which prevents wedging due to bridging. Therefore, it is another feature of this invention to provide in a full complement, preloaded bearing of the type to which this invention relates, cylindrical rollers which have the end portions thereof relieved.

With the above and other objects in view that will hereinafter appear, the nature of the invention will be more clearly understood by reference to the following detailed description, the appended claims and the several views illustrated in the accompanying drawings:

Figure 1:
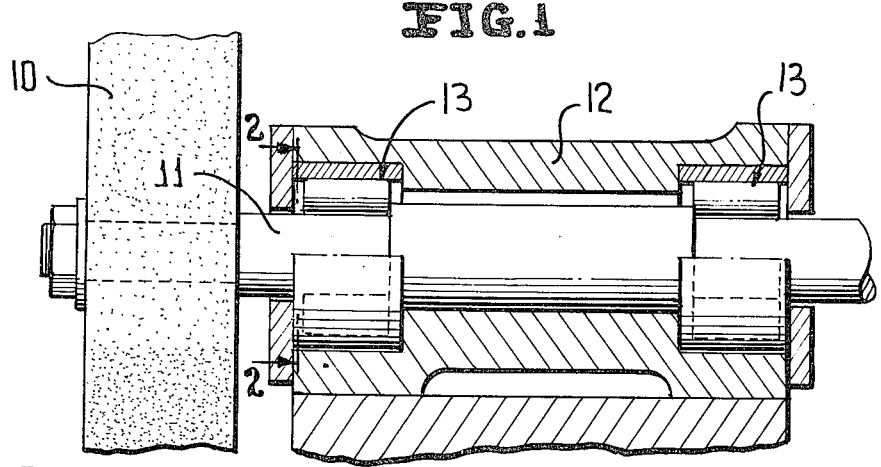
FIG. 1 is a fragmentary sectional view taken through a typical bearing assembly and mounting for a shaft of a machine component requiring minimum runout.

Referring now to FIG. 1 in particular, it will be seen that there is illustrated schematically a support for a machine component 10 utilizing bearings formed in accordance with this invention. The machine component 10, which may be one of many machine components which require a mounting providing a minimum of shaft runout such as grinding wheels, printing press components, etc., is illustrated as being carried by a shaft 11 which, in turn, is rotatably journalled within a support or housing 12 by two axially spaced roller bearing assemblies 13. In accordance with this invention, the roller bearing assemblies are full complement bearings and while the bearing assemblies have been schematically illustrated as having a single row of rollers, it is to be understood that the roller bearing assemblies may have double or triple rows of rollers. It is also to be understood that suitable means may be provided for pressure lubricating the bearing assemblies 13 so as to assure a continued supply of lubricant at the desired temperature. In addition, while the mounting of the shaft 11 has been illustrated as a cantilever mounting, it is to be understood that it is permissible for the machine component to be mounted intermediate the ends of the shaft 11 and that there would be a roller bearing assembly 13 on each side of the machine component 10.

Figure 2:
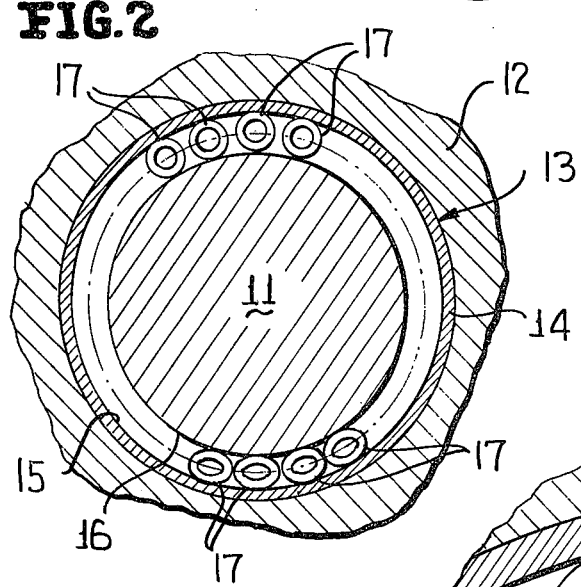
FIG. 2 is an enlarged fragmentary transverse sectional view taken generally along the line 2—2 of FIG. 1 and showing the details of a full complement bearing formed in accordance with this invention.

Reference is now made to FIG. 2 wherein one of the roller bearing assemblies 13 is illustrated in more detail. The roller bearing assembly 13 includes an outer race 14 which is seated in the housing 13 and which has an inner surface defining an outer raceway 15. In the illustrated embodiment of the invention, the outer surface of the shaft 11 defines an inner raceway 16. Disposed between the raceways 15 and 16 is a full complement of rolling elements 17 which in the preferred embodiment of the invention are rollers. More specifically, the rolling elements 17 are hollow rollers.

DISCUSSION OF PRIOR ART PROBLEMS

It is to be understood that while the raceways 15 and 16 and the outer surfaces of the rollers 17 would normally be considered perfectly circular, and if the surfaces are gauged by conventional micrometers which are readable to a dimension on the order of 0.0001 inch, the gauging will so indicate such a cylindrical condition. However, even when the surfaces of the raceways 15 and 16 and the rollers 17 are precision ground, these surfaces will vary from a perfect roundness and will vary from the preset dimension to a certain degree which is measurable by more complex measuring instruments. Further, there will be irregularities in the various surfaces which although minute will appear as mountains and valleys when the surfaces are greatly magnified. Therefore, even if the component of a bearing assembly similar to the bearing assembly 13 were made with the utmost precision and all of the pieces were hand matched, there would be a certain degree of runout if the rollers 17 are solid. On the other hand, from a practical standpoint, even if the bearing assembly 13 is a super precision bearing which is produced in usual commercial production, each of the raceways 15 and 16 will have a major diameter and a minor diameter. It is to be understood that when the major diameter of the raceway 16 is aligned with the minor diameter of the raceway 15, a minimal radial spacing between the raceways 15 and 16 will exist.

In a like manner, when the minor diameter of the inner raceway 16 becomes aligned with the major diameter of the raceway 15, a maximum radial spacing between the raceways 15 and 16 will exist. Accordingly, assuming that there is no diametrial clearance in the bearing and the rollers 17 are perfectly round, the shaft 11 will gyrate about its true center by the difference in radial spacing. This will be the minimum permissive runout of the bearing assembly.

Further, even in super precision bearings there must be a tolerance in the roller diameter. As a result, there is a diametrial clearance in all roller bearings which are commercially produced, even super precision bearings. In view of this, even with super precision bearings there will be a shaft runout. For example, in accordance with the AFBMA standards, a grade ABEC-9 100 mm bearing has a maximum permissible runout of 0.0001 inch. Further, needless to say, such a bearing will be very expensive as compared to a lesser quality bearing such as a grade ABEC-5 bearing.

In accordance with this invention, experiments have been carried out with rollers having a hollowness varying from 50% to 81%. Hollowness of a roller is defined as the diameter of the hole in percentage of the outside diameter of the roller. Generally speaking, rollers having 80% hollowness are too flexible to carry a useful load although they may be used in conjunction with rollers of less hollowness in the same bearing. For general bearing usage, the most advantageous range of hollowness is 55% to 75%. However, rollers for special purpose bearings may have a useful hollowness range from 40% to 80%, depending upon the application requirements.

In accordance with this invention, the solid rollers of a standard full complement bearing have been replaced by hollow rolls, as shown in FIG. 2, having a hollowness varying from 50% to 81%. Further, the diameter of the hollow rolls 17 has been selected wherein the diameter is in excess of the maximum permissible spacing between the raceways 15,16 and the rollers 17 have been installed between the raceways 15,16 in a preloaded condition so that under all operating conditions of the bearing assembly 13, the outer surfaces of the rollers 17 are in pressure contact with the raceways 15,16.

Normal circumferential clearance between one roller and the next adjacent roller is calculated as equal to the maximum roller deflection plus 0.0005 inch. The maximum roller deflection is that deflection achieved by the most heavily loaded roller. It can be realized that the circumferential clearance between rollers will vary as the rollers pass through the loaded zone where the roller deflection is greater and clearance minimal and then through the unloaded zone where the roller deflection is least and roller to roller clearance is increased.

In addition to other advantages of the flexible rollers, the flexible nature of the roller does two things. It automatically spaces the rollers so as to maintain a minimum clearance between them, and secondly, it induces lubricant into the space between the rollers. It has been observed that under actual operating conditions a thin film of lubricant is maintained between the rollers even in the loaded zone and thus, the rollers never touch each other, thereby eliminating a previous undesirable source of friction and wear.

Figure 3:
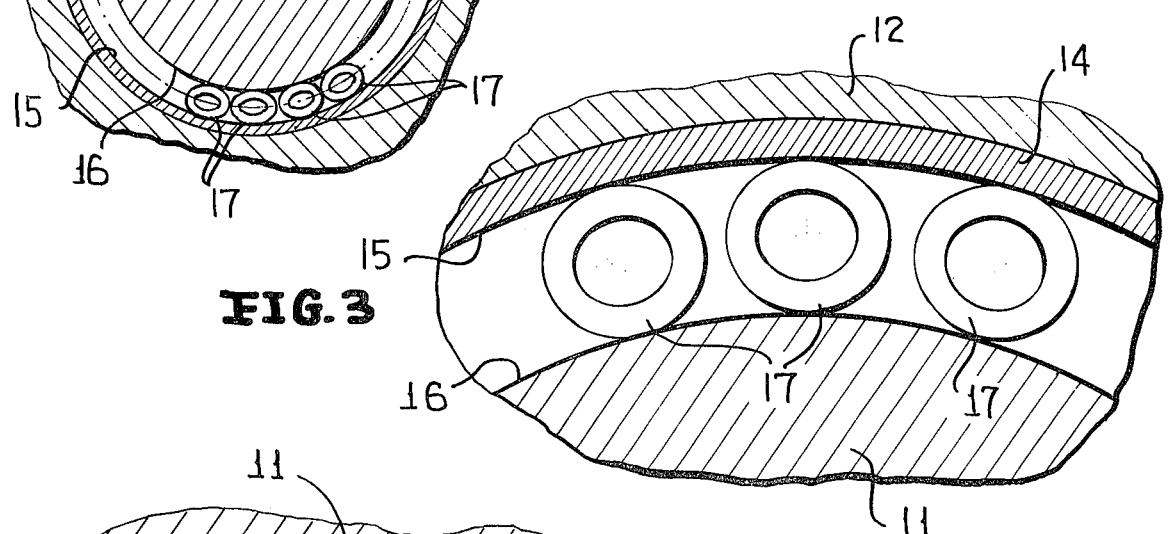
FIG. 3 is an enlarged fragmentary schematic view showing the roller configuration and spacing in the unloaded zone of the bearing.

Reference is now made to FIG. 3 wherein the rollers 17 are illustrated in the unloaded zone of the bearing. It is to be noted that the rollers 17 are slightly deformed, with this deformation being exaggerated, and a spacing 18 is maintained between adjacent rollers 17. The rollers 17 are thus free to have a lubricant flow in between them.

The rollers 17 being in pressure contact with the raceways 15,16 for 360° around the bearings are therefore made to roll at all times and no sliding of the rollers can occur. Because the rollers are made to roll at all times, the rollers do not push one another through the unloaded zone of FIG. 3, and thus are able to maintain the center to center relationship of the rollers which exists in the loaded zone of the bearing with the spacing 18 between adjacent rollers increasing as the rollers pass into the unloaded zone of the bearing due to the resumption of a more nearly cylindrical configuration by the rollers.

Figure 4:
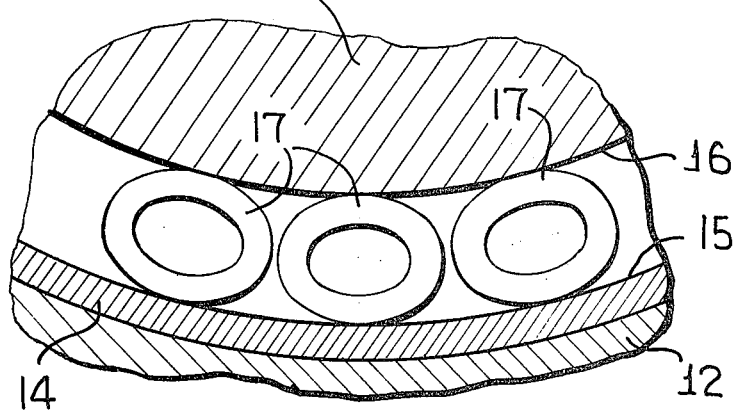
FIG. 4 is a view similar to FIG. 3 and shows the roller configuration and spacing in the loaded zone of the bearing.

As is previously described, with a conventional full complement bearing, the rolling elements, as they approach the center of the loaded zone, move from a loose condition relative to the raceways in the unloaded zone to a gradual increase in pressure contact with the raceways in the loaded zone. As a result, the rollers passing into the loaded zone speed up their circumferential movement. However, when the rollers leave the loaded zone, in a like manner, they slow up their circumferential movement with the result that the rollers crowd up and those rollers passing out of the loaded zone push one another with the rollers in the unloaded zone being no longer driven, but being directly pushed. In accordance with this invention, as is shown in FIG. 4, when the rollers 17 enter into the loaded zone of the bearing, their flexure increases and the rollers become more oval.

As a result, the circumferential extent of each roller 17 increases and the rollers come into substantially touching relation. However, since the rollers are constantly driven and there is no pile up of the rollers exiting from the loaded zone, an oil film is maintained between adjacent rollers at all times and although the clearance 18 between adjacent rollers in the loaded zone becomes minimal, it is maintained on the order of 0.0005 inch, as indicated above, and no less than 0.000050 inch.

The relative movement of the rollers with respect to each other while the bearing is rotating is defined as roller slip. When the rollers 17 pass through the loaded zone of the bearing, the rollers take advantage of the roller slip condition to push themselves apart as they become flexed into a greater oval shape, as is shown in FIG. 4. The major axis of the ovality is in the circumferential direction of the bearing and is at the pitch chord of the rollers. Thus, the rollers space themselves apart. As the rollers roll towards the unloaded area of the bearing, their deflection and ovality decreases and the space 18 between adjacent rollers increases so as to provide space for lubricant, as is shown in FIG. 3.

The flexibility of hollow rollers in a full complement bearing has another advantage in maintaining an oil film between the roller and raceway. There are two conditions which tend to increase the oil film at the rolling contact point and this greatly increases the fatigue life of the bearing. First, the roller now flexed into an oval shape has increased its contact area with both the inner and outer raceway surfaces 15,16. Although small, the effect of this greater contact is to reduce the critical contact stress and increase the surface fatigue life. Secondly, the flexibility of the hollow roller helps retain an oil film on the rolling surfaces. Instead of scouring the oil away, the roller flexes slightly and rolls over the lubricant film to avoid metal-to-metal contact. Although this occurs in solid roller bearings, especially at higher speeds, the hollow rollers promote this condition even at low speeds of rotation.

Because of the foregoing factors, the preloaded hollow roller bearing will operate very satisfactorily without a cage or separator between the rollers. The use of a full complement of hollow rollers in a preloaded assembly does not in any way reduce the operating life of the bearing. In most instances, the hollow roller bearing shows superior characteristics over the solid roller bearing with respect to trueness of rotation, coolness of operation, and length of fatigue life.

The specific advantages of the above described hollow roller bearing can be best defined by relating a typical hollow roller bearing to a typical solid roller bearing with reference to the AFBMA standards. While in many fields there are but superficial standards, the bearing manufacturers, particularly in the United States, have adopted a set of standards by which bearings are identified and through which bearings of different manufacturers are readily interchangeable in any known manner. These standards have been developed by the Anti-Friction Bearing Manufacturers' Association, Inc. and are known as the AFBMA standards. Basically, these standards are fixed. However, minor revisions are made from time to time where the requirements are made more stringent.

These AFBMA standards are more specifically identified in my aforementioned copending application Ser. No. 287,010.

In accordance with the AFBMA standards, bearings are classified as to their accuracy by the tolerance range to which the parts, i.e., inner and outer race, are manufactured. Tolerance ranges are given in four classes:

ABEC-1 has largest tolerance, least accuracy
ABEC-5 less tolerance than 1
ABEC-7 closer tolerance than 5
ABEC-9 has least tolerance, greater accuracy Considering a 100 mm bearing with reference to the AFBMA standards:

A grade ABEC-5 inner race has a bore tolerance of +0; −0.0003 inch and a maximum allowed runout between outside and inside surface of 0.00025 inch.

A grade ABEC-5 outer race has an outside diameter tolerance of +0; −0.0003 inch and a maximum permissible radial runout of 0.0004 inch.

A roller bearing assembled to ABEC-5 tolerances cannot be expected to have a radial runout better than 0.0004 inch assuming one of the races is stationary. Also, when such a bearing is provided with solid rollers and has the normal running clearance of 0.001 inch, which must be added to this minimum runout of 0.0004 inch, the normal runout of a grade ABEC-5 bearing is 0.0014 inch.

However, when a bearing in accordance with this invention is formed and whose races are manufactured to the same above ABEC-5 tolerances, it will have much less runout. The hollow roller bearing has two excellent advantages over the conventional solid roller bearing.

First, the hollow roller bearing is preloaded; that is the rollers have an interference fit between outer and inner races and retain this preload under all operating conditions. In view of this, immediately the 0.001 inch running clearance required by solid roller bearings is eliminated. This, of course, is also an expected result of the bearing disclosed in the aforementioned patent to Harris, et al., U.S. Pat. No. 3,410,618.

The discovered and distinct advantage of the hollow roller bearing over its solid roller counterpart is the ability of the rollers to flex while rotating and absorb the out-of-round condition of the rotating raceway, which raceway is normally the inner race. Thus, an inner race having a radial runout of 0.00025 inch (ABEC-5 tolerance) shows that at most only one half (0.00012 inch) deviation as the rollers will absorb at least half and often better of the runout. In actual practice, it has been found that the runout is reduced to ¼ or 1/5 that normally expected by the manufacturing tolerances used with reference to ABEC-5 grade components. Bearings in accordance with this invention have been made wherein the races are ground to 0.0004 inch tolerance and yet the shaft runout of the assembled bearing was only 0.00002 inch total indicator reading for a shaft deviation of only 10 millionths (0.000010).

In accordance with the AFBMA standards, a grade ABEC-9 100 mm bearing has a maximum permissible runout of 0.0001 inch. Bearings formed in accordance with this invention utilizing all ABEC-5 grade bearing components will provide equal or less runout than the allowable runout for an ABEC-9 bearing, usually 0.000050 radial deviation.

In view of the foregoing, it will be readily apparent that even when one takes into consideration the elimination of the radial clearance required in a roller bearing utilizing solid rollers, as would occur when one utilized hollow rollers in a preloaded condition, the results are unexpected. That is, the results are better than that which would be expected when one calculates the minimum possible runout.

There has also been found that when a roller bearing is provided with hollow rollers it is not necessary that the rollers be manufactured to the precision required with respect to normal solid rollers. The surface finish of a hollow roller may be as much as five to six points higher on the microscale above the surface finish of a normal solid roller.

It has also been found that with the proper utilization of a hollow roller, the shaft runout may be reduced to between 1/5 to 1/10 of a super precision roller bearing utilizing the same precision in the manufacture of the bearing components. At the same time, the life expectancy of the bearing may be increased on the order of 5 to 6 times.

Figure 5:
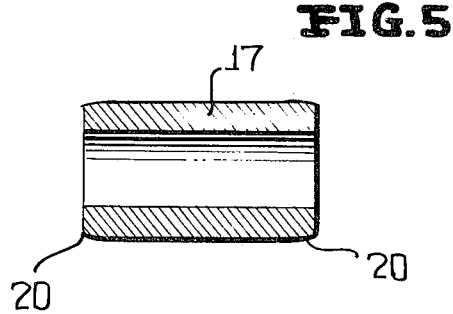
FIG. 5 is an enlarged fragmentary schematic sectional view of a hollow roller in accordance with this invention.

Reference is now made to FIG. 5 wherein the configuration of a typical roller 17 formed in accordance with this invention is illustrated. The roller 17 is initially ground as a cylindrical roller having a length not exceeding four times its diameter and preferably on the order of twice its diameter. Thereafter, the end portions of the roller 17 are relieved as at 20 in any suitable manner. The axial extent of the relieved portions 20 will be on the order of 15%.

It is to be understood that when a roller 17, as constructed in the manner shown in FIG. 5, is preloaded between the raceways 15,16, only the central portion of the roller will be heavily flexed. The relieved end portions 20 may be out of contact with the raceways or may have only light engagement therewith. Thus, in the event the rollers 17 should skew, while the end portions of normal rollers would wedge with the central portion of the rollers bridging on the inner raceway 16, the clearance provided by the relieved end portions 20 will substantially eliminate wedging.

A further feature of the relieved end portions 20 is that principal flexing will occur in the central portion of the roller 17 and the end portions 20 will only be lightly flexed. Inasmuch as cracking normally begins at the extreme ends of the rollers, it will be seen that since the end portions 20 are only lightly flexed as compared to the central portion of a roller, the end portions do not fail due to flexing fatigue and thus cracking is not initiated. Thus, roller life is greatly increased.

It has been found that when the preloading is excessive, even though the rollers 17 do have the relieved end portions 20, the slight relief utilized will not prevent skewing. Therefore, it is to be understood that the amount of relief of the rollers is in accordance with the amount of preloading which may be utilized and this, in turn, is also dependent upon the degree of hollowness of the rollers.

No attempt will be made here to specifically indicate respective ranges of preloading, hollowness, roller diameter to shaft ratios, etc. It is to be understood, however, that the preloading of the rollers should always be such as to provide for a free load roller flexure at least equal to the maximum variation in roller diameter. In addition, the total allowable flexure of the roller must be at least as great as the preload flexure plus the variation in radial spacing between the raceways. In addition, consideration should be given to the flexure of the roller which will occur due to operating loads placed thereon. It will be readily apparent that roller hollowness will be a mere question of bearing engineering design which requires no further discussion here.

It is also to be understood that while in the example bearing illustrated in FIG. 2 the surface of the shaft 11 forms the inner raceway, a separate inner ring or race member may be provided which would be positioned on a shaft and the outer surface of such ring or race member would define the inner raceway of the bearing.

Although only a preferred embodiment of the invention has been specifically illustrated and described herein, it is to be understood that the invention may be equally applied to all shaft installations wherein runout is a critical factor. In addition, although only a roller with a constant diameter bore and a constant diameter outer surface has been illustrated, it is to be understood that it is feasible for one to use other roller configurations without departing from the spirit and scope of the invention, as defined in the appended claims.

I claim:

1. A full complement bearing comprising inner and outer race members and rollers positioned between said race members for individual relative movement; each of said rollers being circumferentially continuous, having a cylindrical central portion prior to being positioned between said race members, being hollow and preloaded between said race members so as to be in pressure contact with each of said race members at all times, and at least the initially cylindrical central portion having a degree of ovality.

2. The bearing of claim 1 wherein the hollowness of said rollers range from 40% to 80% as expressed in the relation of hole diameter to external diameter.

3. The bearing of claim 1 wherein in use said bearing has a loading zone wherein a radial load is primarily transferred from one of said races to the other of said races through said rollers, and wherein in said loading zone said rollers are spaced apart during the operation of said bearing notwithstanding an increase in the ovality thereof.

4. The bearing of claim 1 wherein each of said rollers has relieved end portions and the ratio of roller diameter to length is on the order of 1 to 4 and less.

5. The bearing of claim 1 wherein each of said rollers has relieved end portions and the axial extent of each bearing end portion is on the order of 15%.

6. The bearing of claim 1 wherein the minimum spacing between roller centers is equal to the maximum ovality of a roller plus 0.000050 inch.

7. A method of eliminating roller scuff in a full complement bearing of the type including inner and outer race members and rollers spacing and mounting said race members for relative rotation; said method residing in making said rollers circumferentially continuous, having a central portion cylindrical prior to installation between said race members, hollow, and of a diameter greater than the maximum spacing between said race members with said rollers remaining in pressure contact with said races at all times and are constantly driven.

8. A method of operating a full complement roller bearing of the type including inner and outer race members separated by rollers in a manner to obtain optimum results, said method comprising the steps of forming said rollers of a hollow and circumferentially continuous construction and having at least a cylindrical central portion of a diameter greater than the maximum spacing between said race members, installing the rollers between the race members in preloaded radially stressed oval conditions, said bearing having a loading zone wherein radial forces on said rollers are a maximum rotating one of said race members relative to the other of said race members and thereby continuously driving all of said rollers and gradually radially flattening said rollers to an increased ovality as said rollers enter into said loading zone with the spacing between adjacent rollers slightly decreasing, and then gradually expanding said rollers to a decreased ovality as said rollers pass out of said loading zone to slightly increase the spacing between adjacent rollers and thus define lubricant receiving spaces therebetween to assure the existence of sufficient lubricant between adjacent rollers in said loading zone.

9. The discovery of a method of forming a full complement roller bearing of superior runout characteristics utilizing bearing components of an inferior dimension control, comprising in conjunction with an acceptable standard of grading bearings and bearing components wherein the quality of bearings and bearing components are graded in a predetermined sequence, the steps of selecting companion bearing races of known inferior grade in accordance with said standard, selecting circumferentially continuous hollow rollers of a known grade in accordance with said standard and having at least a cylindrical central portion of a diameter greater than the maximum spacing between said races, assembling a full complement of said rollers in a preloaded condition between said races for obtaining a full complement bearing having the runout characteristics of a bearing of a grade in accordance with said standard superior than that expected from a bearing utilizing races of said known inferior grade and rollers of said known grade without clearance between each roller and said races.

10. The discovered method of claim 9 wherein the runout of said bearing is less than the permissible runout for one only of said races according to the standard of the grade of the selected race.

11. The discovered method of claim 9 wherein said acceptable standards are the known AFBMA standards and the grades thereof are numerical grades with grade 1 bearings and components having largest tolerance and least accuracy and grade 9 bearings and components having least tolerance and greatest accuracy.

* * * * *